United States Patent
Minoura et al.

(10) Patent No.: US 6,704,079 B2
(45) Date of Patent: Mar. 9, 2004

(54) DISPLAY DEVICE

(75) Inventors: Kiyoshi Minoura, Tenri (JP); Shun Ueki, Nara (JP); Masahiko Tomikawa, Funabashi (JP); Eiji Satoh, Tenri (JP); Tomoko Teranishi, Ikoma (JP); Yasuhisa Itoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 10/059,137

(22) Filed: Jan. 31, 2002

(65) Prior Publication Data

US 2002/0149721 A1 Oct. 17, 2002

(30) Foreign Application Priority Data

Feb. 7, 2001 (JP) ........................................ 2001-030359

(51) Int. Cl.[7] ................................................. G02F 1/13
(52) U.S. Cl. ..................................................... 349/113
(58) Field of Search ......................................... 349/113

(56) References Cited

U.S. PATENT DOCUMENTS 6,067,134 A    5/2000   Akiyama et al.
6,091,469 A  * 7/2000   Naito ........................... 349/113
6,490,018 B1 * 12/2002  Taira ........................... 349/113

FOREIGN PATENT DOCUMENTS

JP    10-260427    9/1998
WO    98/57212    12/1998

OTHER PUBLICATIONS

Hashimoto, K et al; "Invited Paper: Reflective Color Display Using Cholesteric Liquid Crystals"; SID International Symposium Digest of Technical Papers; May 1998; pp. 897–900; ISSN0098–966X.

* cited by examiner

Primary Examiner—James Dudek
(74) Attorney, Agent, or Firm—Nixon & Vanderhye, P.C.

(57) ABSTRACT

A display device includes a reflector in which a plurality of elements, each including a number of reflective regions, is arranged. In the reflector, the reflective regions of each said element are disposed so that at least part of incoming light, which has been incident on the element, is reflected by each one of the reflective regions after another and then allowed to go out of the element. At least one of the reflective regions of each said element includes: a light reflective plane; and a light modulating layer that is formed on one side of the light reflective plane so as to face the incoming light.

28 Claims, 8 Drawing Sheets

○ CONVEX POINT
● CONCAVE POINT

○ CONVEX POINT
● CONCAVE POINT

● CONCAVE POINT

ALIGNMENT FILM
C-CF

ALIGNMENT FILM
M-CF

ALIGNMENT FILM
Y-CF

TRANSPARENT RESIN
C-CF

TRANSPARENT RESIN
M-CF

TRANSPARENT RESIN
Y-CF

DISPLAY DEVICE

BACKGROUND OF THE INVENTION

1. Field of the Invention

The present invention relates to a display device including a reflector and more particularly relates to a reflective color display device that ensures increased lightness for color white displayed.

2. Description of the Related Art

Recently, reflective color display devices have rapidly expanded their applications and now found them in various types of mobile electronic units including cell phones, portable game appliances and so on. A reflective color display device has a number of advantages over a transmissive color display device. Specifically, since a reflective color display device needs no backlight, the light source power can be cut down and the space and weight of the backlight required for a transmissive color display device can be saved. In addition, the overall power dissipation of a reflective display device can also be much lower than that of a transmissive display device, thus allowing the user to carry a downsized battery. For these reasons, the reflective color display device is not only effectively applicable to various types of mobile electronic units that should be as light and as thin as possible but also allows the use of a battery of an increased size when a unit including the reflective display device is designed to have the same size and weight as a conventional one. Thus, the reflective display device is expected to increase the longest operating time of those units by leaps and bounds.

A reflective color display device like this also ensures good contrast on its display. When a CRT, i.e., a self-light-emitting display device, or a transmissive color liquid crystal display device is used outdoors under the sun, the contrast ratio thereof decreases considerably. On the other hand, a reflective color display device increases the lightness of the image displayed thereon proportionally to the quantity of ambient light, thus realizing a good contrast ratio. For that reason, a reflective color display device is particularly suitable to outdoor use.

Hereinafter, a configuration for a conventional reflective color liquid crystal display device will be described.

In a reflective liquid crystal display device used extensively today, one or two polarizers are used and color filters are arranged side by side. A reflective liquid crystal display device like this may operate in one of the following three modes:

Twisted nematic (TN) mode in which a display operation is conducted by controlling the optical rotatory power of the liquid crystal layer;

Electrically controlled birefringence (ECB) mode in which a display operation is conducted by controlling the birefringence of the liquid crystal layer by an electric field; and A mixed mode as a combination of the TN and ECB modes.

A conventional reflective display device cannot achieve sufficiently high display quality (in the respect of brightness, in particular). This is because the optical efficiency of the polarizers and laterally arranged color filters is as low as 50% or less. As a result, the conventional reflective device cannot ensure a reflectance high enough to realize a bright image as required.

Thus, to increase the reflectance, reflective display devices requiring no polarizers or color filters have been proposed.

Examples of reflective display devices with no polarizers include a liquid crystal display device (LCD) using a guest host liquid crystal material to which a dye has been added, an LCD using a polymer-dispersed liquid crystal material, and an LCD using a cholesteric liquid crystal material. On the other hand, a color display device, in which three display panels for three different colors are stacked one upon the other, has been developed as a type including no horizontally arranged color filters. Display devices of this type are disclosed in Society of Information Display '98 Digest (p. 897) and Japanese Laid-Open Publication No. 10-260427, for example.

However, the process of fabricating a single display device by stacking three panels one upon the other is overly complicated. What is worse, the incoming light is differently modulated by the respective liquid crystal layers in those stacked panels, thus increasing the resultant parallax easily. To reduce this parallax, the thickness of an intermediate substrate, located between adjacent panels, should be sufficiently smaller than the size of each pixel. Accordingly, the intermediate substrates need to be made of a film-like material. Nevertheless, it is very difficult to form active elements like TFTs on the film-like material.

The display device disclosed in Society of Information Display '98 Digest (p. 897) uses a liquid crystal material having memory properties to conduct a display operation by a passive-matrix addressing technique requiring no active elements. Thus, the intermediate substrates may be relatively thin. However, even in the passive-matrix addressing method, a transparent electrode should also be formed on each of the intermediate substrates. Accordingly, the thickness of the transparent substrates can be no smaller than about 100 $\mu$m, which is approximately equal to the size of each pixel. Consequently, the parallax problem is still insoluble by this technique, either.

The display device disclosed in Japanese Laid-Open Publication No. 10-260427 adopts an active-matrix addressing technique. In this display device, TFTs (i.e., exemplary active elements) are arranged on the backmost substrate. In addition, this display device uses a connector electrode that extends through all of those panels stacked, thereby realizing an active-matrix addressing on the stacked panels. However, the transparent electrode should also be formed on each of the intermediate substrates. Accordingly, the thickness of each intermediate substrate cannot be much smaller than the size of each pixel, thus also causing a parallax disadvantageously.

On the other hand, a reflective color display device including a corner reflector is disclosed in International Publication Number WO 98/57212. In the corner reflector, the incoming light undergoes total internal reflection at the three facets thereof. In this case, the incoming light is modulated by getting the reflectance of each of these facets controlled independently. In conducting a color display operation using this reflective display device, there is no need to stack the three types of panels, thus eliminating the parallax problem. In this display device, however, the reflectance of each facet of the corner reflector is controlled by moving a member located behind the facet. More specifically, the reflectance of each facet is controllable independently by moving the member between a position at which the member is in contact with the facet and a position at which the member is separated from the facet by a distance approximately equal to the wavelength of visible radiation. It is difficult for a device of this type to realize a high-definition display operation.

SUMMARY OF THE INVENTION

In order to overcome the problems described above, the present invention provides a display device for conducting a high-definition display operation by ensuring sufficiently high contrast ratio and brightness and by eliminating the parallax problem even though the device is reflective.

A display device according to an aspect of the present invention includes a reflector in which a plurality of elements, each including a number of reflective regions, is arranged. In the reflector, the reflective regions of each said element are disposed so that at least part of incoming light, which has been incident on the element, is reflected by each one of the reflective regions after another and then allowed to go out of the element. At least one of the reflective regions of each said element includes: a light reflective plane; and a light modulating layer that is formed on one side of the light reflective plane so as to face the incoming light.

In a preferred embodiment of the present invention, each of the reflective regions of each said element includes the light reflective plane and the light modulating layer, and the light modulating layers included in each said element modulate the incoming light in mutually different wavelength ranges.

In another preferred embodiment, the light reflective plane is a surface of a metal layer.

In still another preferred embodiment, the light reflective plane is a boundary between two types of materials having mutually different refractive indices.

In yet another preferred embodiment, the light reflective plane includes a planar portion.

In this particular embodiment, each said element preferably includes the three planar portions that are opposed perpendicularly to each other to form a corner cube.

More specifically, each of the three planar portions that make up the corner cube preferably has a substantially square shape. In each said element, the three planar portions of the corner cube are opposed mutually adjacently and perpendicularly to each other to define three sides of a single cube that share one vertex.

In that case, the three light modulating layers, disposed on the three sides of each said cube that are opposed perpendicularly to each other to share one vertex thereof with each other, may modulate the incoming light in the same wavelength range.

Alternatively, the reflective regions may be disposed on a single continuous curved surface.

In yet another preferred embodiment, each said light modulating layer may switch from a state of absorbing part of the incoming light failing within a selected wavelength range into a state of transmitting another part of the incoming light falling within a wavelength range that includes at least the selected wavelength range, or vice versa.

A display device according to another aspect of the present invention includes a reflector in which a plurality of elements, each including three reflective regions, is arranged. In the reflector, the three reflective regions of each said element are disposed so that at least part of incoming light, which has been incident on the element, is reflected by each one of the three reflective regions after another and then allowed to go out of the element. Each of the three reflective regions of each said element includes: a light reflective plane; and a light modulating layer that is formed on one side of the light reflective plane so as to face the incoming light.

In a preferred embodiment of the present invention, the display device further includes means for separately driving the three light modulating layers included in the three reflective regions of each said element.

In another preferred embodiment of the present invention, the light modulating layer included in a first one of the three reflective regions of each said element is a host liquid crystal layer including a guest that absorbs red. The light modulating layer included in a second one of the three reflective regions is a host liquid crystal layer including a guest that absorbs green. And the light modulating layer included in the other, third reflective region is a host liquid crystal layer including a guest that absorbs blue.

In an alternative embodiment, the light modulating layer included in a first one of the three reflective regions of each said element may include: a switching layer changing from a state of selectively reflecting red into a state of selectively transmitting red, or vice versa; and a color filter absorbing red. The light modulating layer included in a second one of the three reflective regions may include: a switching layer changing from a state of selectively reflecting green into a state of selectively transmitting green, or vice versa; and a color filter absorbing green. And the light modulating layer included in the other, third reflective region may include: a switching layer changing from a state of selectively reflecting blue into a state of selectively transmitting blue, or vice versa; and a color filter absorbing blue.

In this particular embodiment, each said switching layer may be made of a cholesteric liquid crystal material.

Alternatively, each said switching layer may also be made of a holographic polymer-dispersed liquid crystal material.

A display device according to still another aspect of the present invention includes a reflector in which a plurality of elements, each including a number of reflective regions, is arranged. In the reflector, the reflective regions of each said element are disposed so that at least part of incoming light, which has been incident on the element, is reflected by each one of the reflective regions after another and then allowed to go out of the element. At least one of the reflective regions of each said element includes a light modulating layer that is changeable between at least two states in which light, falling within a particular wavelength range selected from the visible range, is absorbed to mutually different degrees.

In a preferred embodiment of the present invention, the light modulating layer has a thickness approximately equal to or greater than the wavelength of visible radiation.

In another preferred embodiment of the present invention, the light modulating layer changes its states when a voltage is applied thereto.

In this particular embodiment, the display device preferably further includes an electrode for changing the states of the light modulating layer.

More specifically, the light modulating layer preferably contains a substance that absorbs the light falling within the particular wavelength range, and a physical state of the substance preferably changes when the voltage is applied thereto.

Alternatively, the light modulating layer may contain a substance that absorbs the light falling within the particular wavelength range, and a position of the substance may change when the voltage is applied thereto.

In still another preferred embodiment, the light modulating layer may contain a substance that reflects visible radiation.

In yet another preferred embodiment, the light modulating layer may include: a medium; a first type of particles, which are dispersed in the medium, absorb the light falling within the particular wavelength range and are movable in the medium; and a second type of particles, which are also dispersed in the medium and reflect visible radiation. A degree to which the light modulating layer absorbs the light falling within the particular wavelength range may be controlled by the movement of the first type of particles.

In yet another preferred embodiment, the light modulating layer includes a rotator that is changeable from a state of absorbing the light falling within the particular wavelength range into a state of reflecting the visible radiation, or vice versa, when rotates.

In this particular embodiment, the rotator may be a particle including multiple parts that have mutually different optical properties.

A display device according to yet another aspect of the present invention includes a reflector that includes a concave portion reflecting at least part of incoming light a number of times. A light modulating layer, which is changeable between at least two states in which light, falling within a particular wavelength range selected from the visible range, is absorbed to mutually different degrees, has been formed in the concave portion of the reflector.

A display device according to yet another aspect of the present invention includes a reflector that includes a concave portion reflecting at least part of incoming light a number of times. First and second light modulating layers have been formed in the concave portion of the reflector. The first light modulating layer is changeable between at least two states in which light, falling within a first wavelength range selected from the visible range, is absorbed to mutually different degrees. The second light modulating layer is changeable between at least two states in which light, falling within a second wavelength range selected from the visible range, is absorbed to mutually different degrees. The second wavelength range is different from the first wavelength range. A spectral distribution of the incoming light is changeable by the first and second light modulating layers.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

According to preferred embodiments of the present invention, a full-color display operation is realized by using a reflector such as a corner cube array (which will also be herein referred to as a "corner reflector" collectively). In the reflector for use in the preferred embodiments of the present invention, a plurality of elements, each including a number of reflective regions, is arranged. The reflective regions of each element are disposed so that at least part of incoming light, which has been incident on the element, is reflected by each one of the reflective regions after another and then allowed to go out of the element.

Hereinafter, the principle of display operation that uses a "corner cube array type reflector" (i.e., an exemplary reflector of the present invention) will be described with reference to FIGS. 1A and 1B.

Figure 1A:
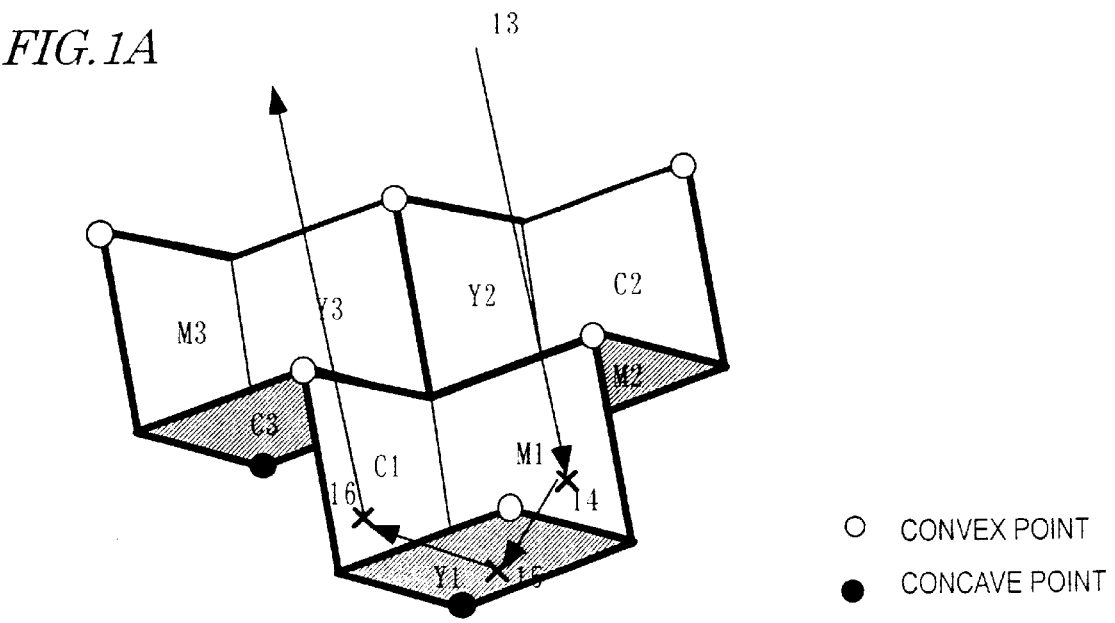
FIGS. 1A and 1B are respectively a perspective view and a plan view illustrating configuration and operation of a corner cube array type reflector for use in a preferred embodiment of a display device according to the present invention.
Figure 1B:
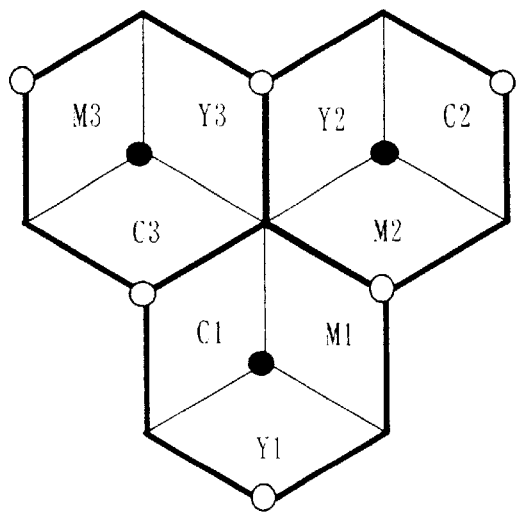

FIGS. 1A and 1B are respectively a perspective view and a plan view illustrating three elements included in the corner cube array type reflector. Although only three elements are illustrated in FIGS. 1A and 1B for the sake of simplicity, a great number of elements having the same configuration are actually arranged densely on a single substrate.

Figure 2A:
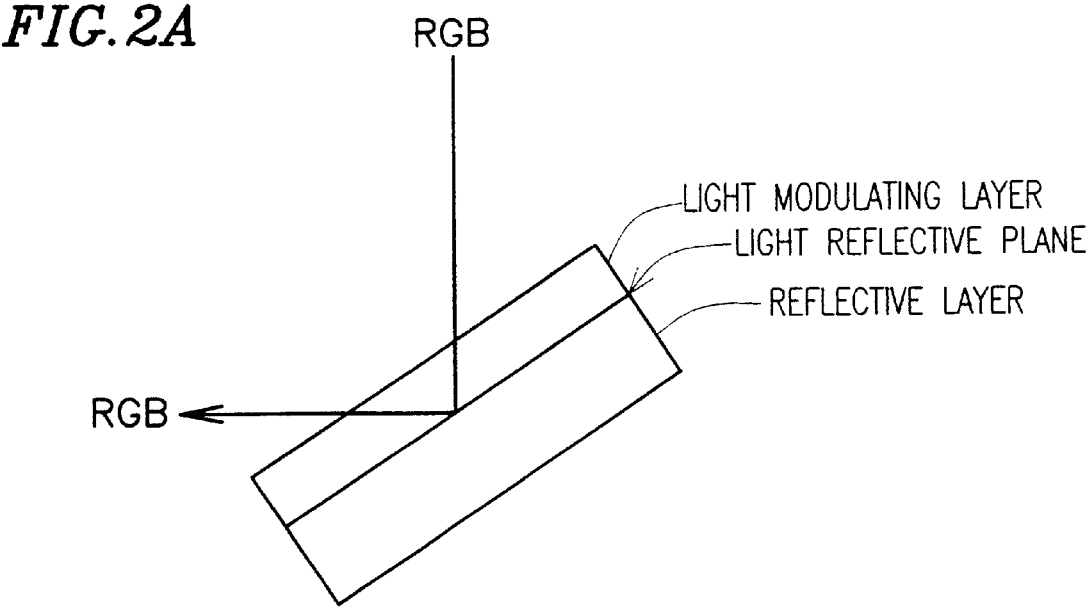
FIGS. 2A and 2B are cross-sectional views illustrating how an exemplary light modulating layer for use in the preferred embodiment of the present invention may operate.
Figure 2B:
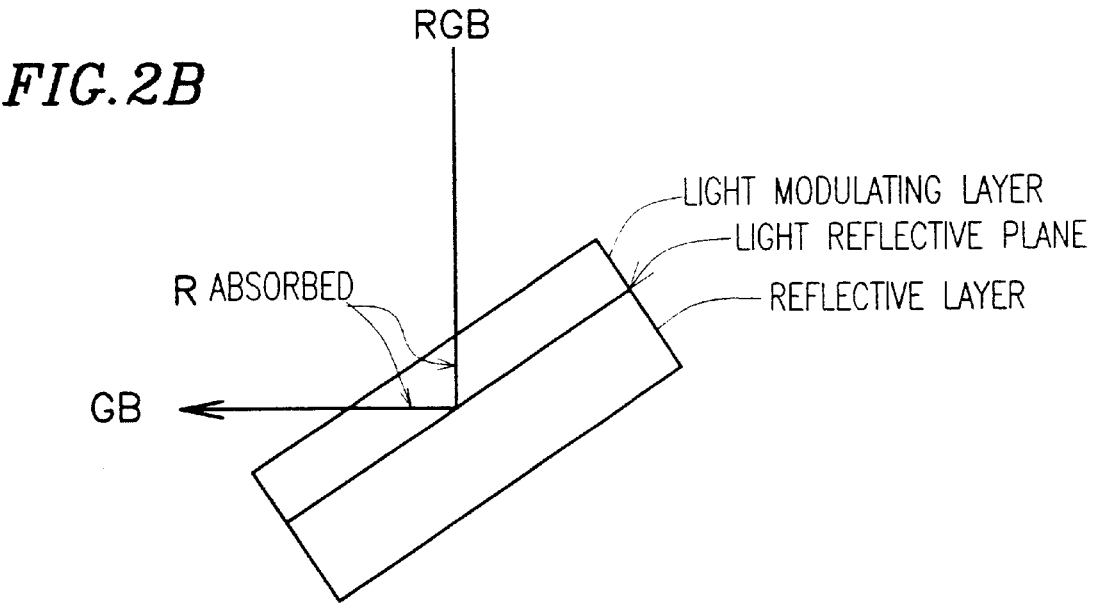

In the example illustrated in FIGS. 1A and 1B, each element includes three reflective regions. Look at the element illustrated at the bottom of FIG. 1B, for example. As shown in FIG. 1B, this element includes three reflective regions M1, Y1 and C1, each of which includes a light reflective plane and a light modulating layer formed on one side of the light reflective plane so as to face the incoming light as shown in FIGS. 2A and 2B. The thickness of the light modulating layer may be approximately equal to or greater than a wavelength of visible radiation. In the preferred embodiment illustrated in FIGS. 2A and 2B, the light reflective plane is formed on the surface of a reflective layer.

FIGS. 2A and 2B illustrate a cross-sectional structure of the reflective region C1 as an example. As shown in FIGS. 2A and 2B, white light (i.e., RGB light) including three wavelength components corresponding to the three primary colors of red (R), green (G) and blue (B) is incident on the reflective region C1. As will be described later, the light modulating layer may be embodied in various manners.

Specifically, the light modulating layer of the example illustrated in FIGS. 2A and 2B may switch between a first state of transmitting the white light and a second state of selectively absorbing light falling within the R wavelength range and transmitting light falling within the B and G wavelength ranges (i.e., a cyan range). In the following description, the light falling within the R wavelength range will be herein referred to as "R light". In the first state illustrated in FIG. 2A, the white light (RGB) is reflected after having been transmitted through the light modulating layer. On the other hand, in the second state illustrated in FIG. 2B, the cyan light (GB) is reflected after having been transmitted through the light modulating layer. Each of the other two reflective regions M1 and Y1 also has a cross-sectional structure similar to that of the reflective region C1. However, these reflective regions C1, M1 and Y1 are different from each other in the properties of their light modulating layers. Specifically, in the reflective region M1, the light modulating layer switches between a state of transmitting the white light and a state of reflecting magenta light. In the reflective region Y1, the light modulating layer switches between a state of transmitting the white light and a state of reflecting yellow light.

A light modulating structure like these is realized by disposing a guest host liquid crystal layer as the light modulating layer on a metal layer.

Referring back to FIGS. 1A and 1B, the three light reflective planes included in each element of the reflector are opposed perpendicularly to each other to form three square sides of a virtual cube. In FIGS. 1A and 1B, the solid circles (●) indicate the deepest points of the concave portion of the reflector (which points will be herein referred to as "concave points"). That is to say, each of these concave points corresponds to a vertex of its associated cube. On the other hand, the open circles (○) indicate convex vertices of the reflector (which will be herein referred to as "convex points"). Each set of three convex points corresponds to three other vertices of its associated cube.

As shown in FIG. 1A, a light ray 13, which has been incident onto one of the elements, is reflected by one of the three reflective planes of the element after another so as to be retro-reflected in a direction opposite (or antiparallel) to the direction of the incident ray 13. This retro-reflection always occurs according to a principle of geometrical optics irrespective of the angle of incidence of the incoming ray 13 so long as the three reflective planes are opposed perpendicularly to each other.

This point will be described in further detail.

First, the light ray 13, which has been incident onto the reflective region M1 of the corner cube array, is reflected from a point 14 on the reflective region M1 toward the reflective region Y1. Next, the light ray 13 is reflected from a point 15 on the reflective region Y1 toward the reflective region C1. Finally, the light ray 13 is reflected from a point 16 on the reflective region C1 toward the outside of the display device. In this manner, each element operates as a corner cube and exhibits retro-reflection properties. Accordingly, a light ray that has been incident from an arbitrary direction is reflected three times so as to be retro-reflected to a direction antiparallel to the direction of the incident ray. Each of these elements displays rotational symmetry. For that reason, even if the light ray has been incident first onto the reflective region Y1 or C1, not the reflective region M1, the incident ray is also reflected three times and then retro-reflected to the outside of the device.

As will be described later, in a preferred embodiment of the present invention, the light modulating layer, which is disposed on one of the three light reflective planes of each element so as to face the incident ray, is controlled independently of the other two light modulating layers. As a result, the light ray 13 is modulated by one of the three light modulating layers after another in each element.

In the example illustrated in FIG. 1A, the light ray 13 is reflected in the order of reflective region M1, reflective region Y1 and reflective region C1. The order of reflection is changeable with the angle of incidence and incident point of the light ray 13. But no matter in what order the light ray 13 is reflected, the modulations caused by the three reflective regions M1, Y1 and C1 included in each single element are always superposed one upon the other, thereby modulating the spectrum of the light ray 13.

As described above, the light modulating layer of the reflective region C1 switches between the state of reflecting the cyan light (GB) and the state of reflecting all of the light falling within the visible range. Such a light modulating layer is provided not only for the reflective region C1 but also for the reflective regions C2 and C3 of the other two elements.

Each of the light modulating layers of the reflective regions M1, M2 and M3 switches between the state of reflecting light falling within the magenta wavelength range and the state of reflecting all of the light falling within the visible range. And each of the light modulating layers of the reflective regions Y1, Y2 and Y3 switches between the state of reflecting light falling within the yellow wavelength range and the state of reflecting all of the light falling within the visible range.

In such a structure, if these three reflective regions C1, M1 and Y1 are all in the state of reflecting all of the light falling within the visible range, then the incident light (i.e., white light such as sunlight) is reflected in the entire visible range. As a result, color white is displayed.

On the other hand, if one reflective region C1 assumes the state of reflecting the light falling within the cyan wavelength range and the other two reflective regions M1 and Y1 both assume the state of reflecting all of the incident light falling within the visible range, then only that part of the incident light falling within the cyan wavelength range is reflected. Consequently, color cyan is displayed.

In this manner, by selectively allowing the light modulating layers of those three reflective regions C1, M1 and Y1 to absorb light falling within a particular wavelength range, various colors may be displayed as shown in the following Table 1:

TABLE 1

| C1 | M1 | Y1 | Color displayed |
|---|---|---|---|
| Transmit all | Transmit all | Transmit all | White |
| Absorb red | Transmit all | Transmit all | Cyan |
| Transmit all | Absorb green | Transmit all | Magenta |
| Transmit all | Transmit all | Absorb blue | Yellow |
| Absorb red | Absorb green | Transmit all | Blue |
| Transmit all | Absorb green | Absorb blue | Red |
| Absorb red | Transmit all | Absorb blue | Green |
| Absorb red | Absorb green | Absorb blue | Black |

In Table 1, "transmit all" refers to the state in which the light modulating layer transmits all of the light failing within the visible range. Also, "absorb red", for example, refers to the state in which the light modulating layer selectively absorbs light falling within the red part of the visible range and transmits light failing within the other parts of the visible range. Accordingly, by adjusting the degrees of absorption of the respective colors, a full-color display is realized.

As described above, if the light modulating layer of the reflective region C1 is in the "absorb red" state, the other parts of the incident light (white light), falling within the non-red parts of the visible range, e.g., light falling within the cyan part of the visible range, are not absorbed into the light modulating layer but reflected from the light reflective plane. The relationships between the color(s) of the light reflected from the reflective region(s) C1, M1 and/or Y1 and the color displayed are shown in the following Table 2:

TABLE 2

| C1 | M1 | Y1 | Color displayed |
|---|---|---|---|
| Reflect all | Reflect all | Reflect all | White |
| Cyan | Reflect all | Reflect all | Cyan |
| Reflect all | Magenta | Reflect all | Magenta |
| Reflect all | Reflect all | Yellow | Yellow |
| Cyan | Magenta | Reflect all | Blue |
| Reflect all | Magenta | Yellow | Red |
| Cyan | Reflect all | Yellow | Green |
| Cyan | Magenta | Yellow | Black |

In Table 2, "reflect all" refers to the state in which the reflective region reflects all of the light falling within the visible range.

The light may be modulated by this set of reflective regions C1, M1 and Y1 independently of the other two sets of reflective regions C2, M2 and Y2 and C3, M3 and Y3. Accordingly, three different colors may be displayed by three different elements. Thus, each single element may constitute one pixel of the image.

By utilizing these principles of display, the present invention realizes a brightly displayed, full-color image without arranging color filters side by side or using any polarizer.

Hereinafter, specific preferred embodiments of the present invention will be described.

Embodiment 1

A first specific preferred embodiment of a display device according to the present invention will be described with reference to FIGS. 3A through 3D.

Figure 3A:
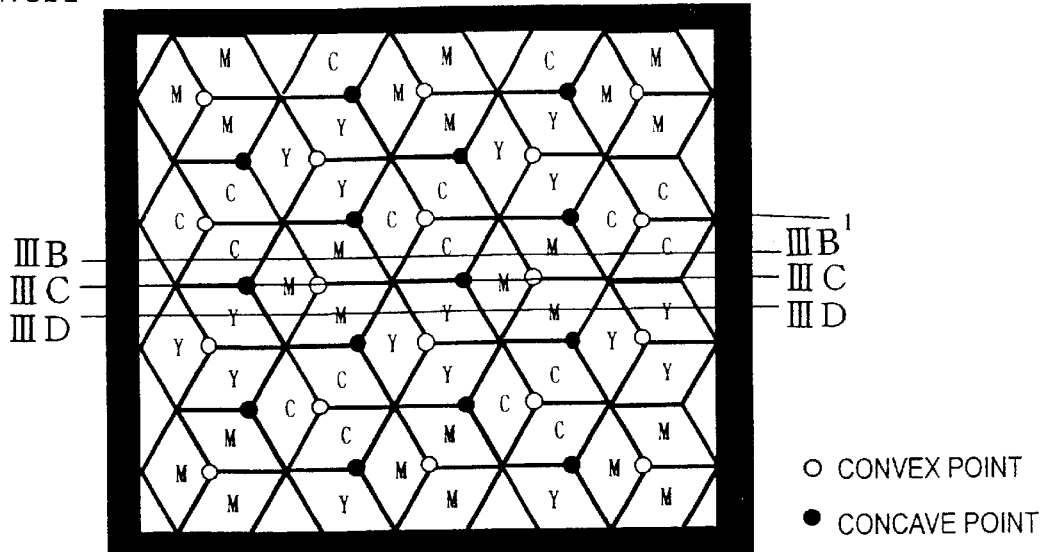
FIG. 3A illustrates a planar layout for reflective planes according to a first specific preferred embodiment of the present invention.
Figure 3B:
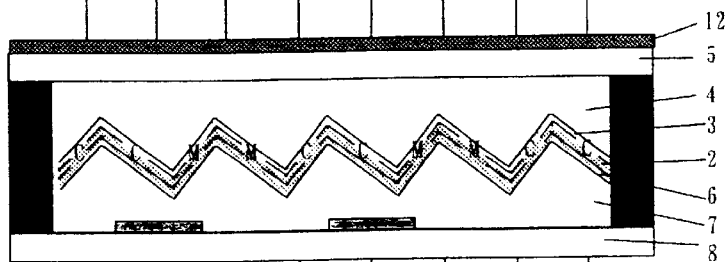
FIGS. 3B, 3C and 3D are cross-sectional views thereof taken along the lines IIIB—IIIB, IIIC—IIIC and IIID—IIID shown in FIG. 3A, respectively.
Figure 3C:
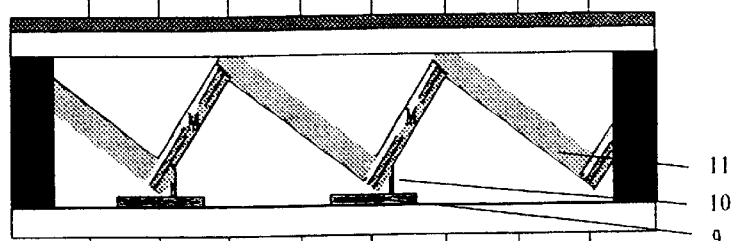
Figure 3D:
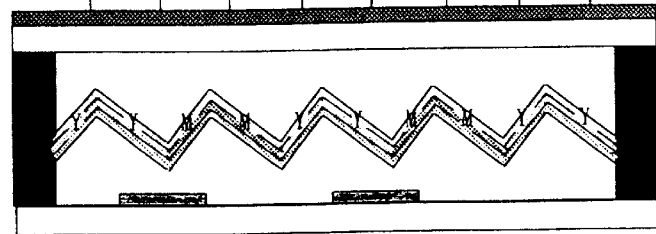

FIG. 3A illustrates a planar layout for the reflective planes of a reflective color display device 1 according to the first embodiment, while FIGS. 3B, 3C and 3D are cross-sectional views thereof taken along the lines IIIB—IIIB, IIIC—IIIC and IIID—IIID shown in FIG. 3A, respectively.

As shown in FIG. 3B, the display device 1 includes a pair of substrates 5 and 8, a liquid crystal layer 2 interposed between the substrates 5 and 8 and a scattering film 12 deposited on one side of the substrate 5 that faces the incoming light. The incoming light is incident through the substrate 5, so the substrate 5 will be herein referred to as an "incidence-side substrate". On the other hand, the substrate 8 supports the reflective planes, and will be herein referred to as a "reflection-side substrate". Hereinafter, these members will be described in detail.

First, the reflection-side substrate 8 will be described.

In this preferred embodiment, the reflection-side substrate 8 is a platelike substrate made of glass, plastic or any other suitable material. This substrate 8 has only to support the elements and members to be described below and need not be made of a material transparent to visible radiation.

On the surface of the substrate 8 that faces the liquid crystal layer 2, a plurality of TFTs 9 are arranged in columns and rows and data lines and gate lines (not shown) are formed. Each of the TFTs 9 turns ON and OFF to electrically connect or disconnect its associated light modulating layer to/from its associated data line. Each of the data lines electrically connects a driver (e.g., source driver not shown) to the respective sources of its associated TFTs 9. A signal charge, corresponding to the potential level on each data line, is used to drive intended ones of the light modulating layers by way of selected ones of the TFTs 9. On the other hand, each of the gate lines electrically connects a driver (e.g., gate driver not shown) to the respective gates of its associated TFTs 9. Each gate line is used to select intended ones of the TFTs 9 and to turn those TFTs 9 selected from OFF state into ON state.

A corner cube array 7 made of a resin, for example, is provided over those lines and TFTs 9. The corner cube array 7 is a reflector on which a plurality of elements, each having the structure shown in FIGS. 1A and 1B, is arranged regularly and which has the planar layout shown in FIG. 3A. It should be noted that the elements illustrated in FIGS. 3A through 3D are smaller in number and greater in size than the actual ones for the sake of simplicity. The number of elements actually provided may be from approximately 10,000 to approximately 1,000,000 per display area having a size of about 2 inches diagonally.

On each reflective plane of the corner cube array 7, a reflective film 6 of a metal (e.g., silver) is deposited to a thickness of about 150 nm, for example. The metallic reflective film 6 functions not only as the reflective layer illustrated in FIGS. 2A and 2B but also as an electrode for driving the light modulating layer formed thereon and changing the modulation states thereof.

In this preferred embodiment, the metallic reflective film 6 on one light reflective plane is electrically isolated from the reflective film 6 on another light reflective plane, and those reflective films 6 have been patterned so as to have mutually independent potential states. As shown in FIG. 3C, each metallic reflective film 6 is electrically connected to the drain of its associated TFT 9 underlying the film 6 by way of a contact hole 10 that has been formed through the corner cube array 7. The potential level on each metallic reflective film 6 may be regulated to a level reflecting that on the associated data line by performing active-matrix addressing using the driver (not shown).

It should be noted that a single display pixel does not have to be made of a single element but may be a combination of multiple elements. In the latter case, the size of one pixel is greater than that of one element.

The incidence-side substrate 5 is disposed so as to face the surface of the reflection-side substrate 8 that faces the liquid crystal layer 2. The incidence-side substrate 5 may also be a platelike substrate made of glass, plastic or any other suitable material. This substrate 5 should be made of a material transparent to visible radiation.

A corner cube array 4 made of a transparent resin, for example, is provided on the surface of the incidence-side substrate 5 that faces the liquid crystal layer 2. This corner cube array 4 has been formed so that the surfaces of the array 4 are substantially equally spaced apart from the opposed surfaces of the corner cube array 7 everywhere. A transparent electrode 3 made of an ITO film with a thickness of about 200 nm has been formed on the surfaces of the corner cube array 4 that face the liquid crystal layer 2. It should be noted that the transparent electrode 3 is commonly used for all display pixels and is not divided for the respective light reflective planes.

The gap between the pair of opposed corner cube arrays 4 and 7 is filled with the liquid crystal layer (i.e., light modulating layers) 2 made of a liquid crystal mixture. The gap between the corner cube arrays 4 and 7 may be from about 5 μm to about 20 μm, for example. The corner cube array 4 does not function as a reflector but creates, along with the corner cube array 7, the gap to be filled with the liquid crystal layer 2. In addition, the corner cube array 4 serves as a member for supporting the transparent electrode 3 that controls the modulation states of the liquid crystal layer 2.

In this preferred embodiment, the liquid crystal layer 2 may be formed by printing a liquid crystal mixture (e.g., a guest host liquid crystal mixture), including dyes that absorb colors red, green and blue, respectively, on the associated concave points of the corner cube array 4 by a bubble-jet method. In the corner cube array 7 of this preferred embodiment, each of the three planar portions that make up a corner cube has a substantially square shape, and the three square planar portions of the corner cube are opposed mutually adjacently and perpendicularly to each other to define three sides of a single cube that share one vertex. Thus, according to the method described above, the light modulating layers, disposed on the three perpendicular sides of a convex cube that share one vertex (as indicated by one of the solid circles shown in FIG. 3A), may be made of the same type of material (i.e., a material that modulates the incoming light in the same wavelength range).

It should be noted that the guest host (GH) liquid crystal material is obtained by dissolving a dichroic dye (i.e., guest), absorbing visible radiation anisotropically in the major- and minor-axis directions of a molecule, in a liquid crystal material (i.e., host) having a constant molecular orientation. The molecules of the dichroic dye are oriented parallel to the liquid crystal molecules. Accordingly, if the molecular orientations of the host liquid crystal material are changed by applying a voltage thereto, then the molecular orientations of the guest dye also change. In this manner, the quantity of visible radiation absorbed into the dichroic dye is controllable by the voltage applied.

In this preferred embodiment, liquid crystal layers, including mutually different types of dyes, are disposed on a plurality of regions that are adjacent to each other within a single element (or concave portion). Accordingly, as shown in FIG. 3C, a polymer wall 11 may be provided along the edge line between adjacent corner cubes so that the respective dyes (dye particles) are not mixed with each other.

Next, it will be described how this display device conducts a display operation.

In this preferred embodiment, light, which has been emitted from an external light source (e.g., sun or a room illuminator) located outside of the display device, is incident onto the front of the display device. After having been scattered by the scattering film 12, the incident light is transmitted through the incidence-side substrate 5, corner cube array 4 and transparent electrode 3 and then enters the liquid crystal layer 2. Thereafter, the incident light is selectively transmitted through the liquid crystal layer 2 and then selectively reflected by the metallic reflective film 6 on the corner cube array 7 depending on the wavelength thereof.

It depends on the actions of the respective reflective regions C, M and Y how the incident light is reflected. This control is accomplished by applying appropriate potentials from an external driver to the metallic reflective films 6 on the respective reflective regions.

In this preferred embodiment, the reflective region C switches between the state of absorbing light falling within the red wavelength range (i.e., reflecting light failing within the cyan wavelength range) and the state of reflecting all of the light falling within the visible range. This switching operation may be carried out by changing the molecular orientations of the liquid crystal layer 2 in accordance with the voltage applied between the transparent electrode 3 and the metallic reflective films 6.

On the other hand, the reflective region M switches between the state of absorbing light falling within the green wavelength range (i.e., reflecting light falling within the magenta wavelength range) and the state of reflecting all of the light falling within the visible range. And the reflective region Y switches between the state of absorbing light falling within the blue wavelength range (i.e., reflecting light falling within the yellow wavelength range) and the state of reflecting all of the light falling within the visible range. These switching operations may also be performed as in the reflective region C.

In this preferred embodiment, each of the elements of the corner cube array 7 includes the reflective regions C, M and Y having the configurations described above. Accordingly, the incoming light, which has been incident onto each element, is reflected by each one of the reflective regions C, M and Y after another and then retro-reflected to the direction opposite to that of the incoming light. This retro-reflected light is transmitted through the corner cube array 4 and the incidence-side substrate 5 and then scattered by the scattering film 12. The observer's eyes receive the light that has been scattered by the scattering film 12 to recognize an image displayed.

In this preferred embodiment, the reflective regions C, M and Y of each element are driven independently, thereby realizing the full-color display operation as shown in Tables 1 and 2. Also, if the tilts of the liquid crystal molecules are adjusted by changing the voltages applied to the liquid crystal layers in the respective reflective regions, then the reflection characteristics (i.e., reflectances) of the reflective regions are controllable arbitrarily. As a result, a gray-scale display is also realized.

In the preferred embodiment described above, the scattering film 12 is disposed on the front of the incidence-side substrate 5 to scatter the retro-reflected light. Alternatively, the scattering film 12 may be replaced with a polymer-dispersed guest host liquid crystal layer. Optionally, the reflector may also be provided with the light scattering ability by finely roughening the surfaces of the corner cube array 7 and/or the metallic reflective films 6. As another alternative, the corner cube array 4 or the incidence-side substrate 5 may also have the light scattering ability.

According to this preferred embodiment, the incoming light is not absorbed in vain into the color filters or polarizers, thus increasing the reflectance considerably and realizing the display of a much brighter image.

Embodiment 2

Next, a second specific preferred embodiment of a display device according to the present invention will be described with reference to FIG. 4.

The reflective color display device 31 of this second preferred embodiment has basically the same structure as that illustrated in FIGS. 3A through 3D. That is to say, as in the reflective color display device 1, a plurality of elements, each having the three reflective regions, is arranged on each of the corner cube arrays. And each set of three reflective regions is disposed so that at least part of the incoming light, which has been incident on the element, is reflected by each one of the three reflective regions after another (i.e., three times in total) and then allowed to go out of the element.

The display device 31 of this second embodiment is different from the display device 1 of the first embodiment in the structure of the light modulating layers. Hereinafter, this point will be described in detail.

Figure 4:
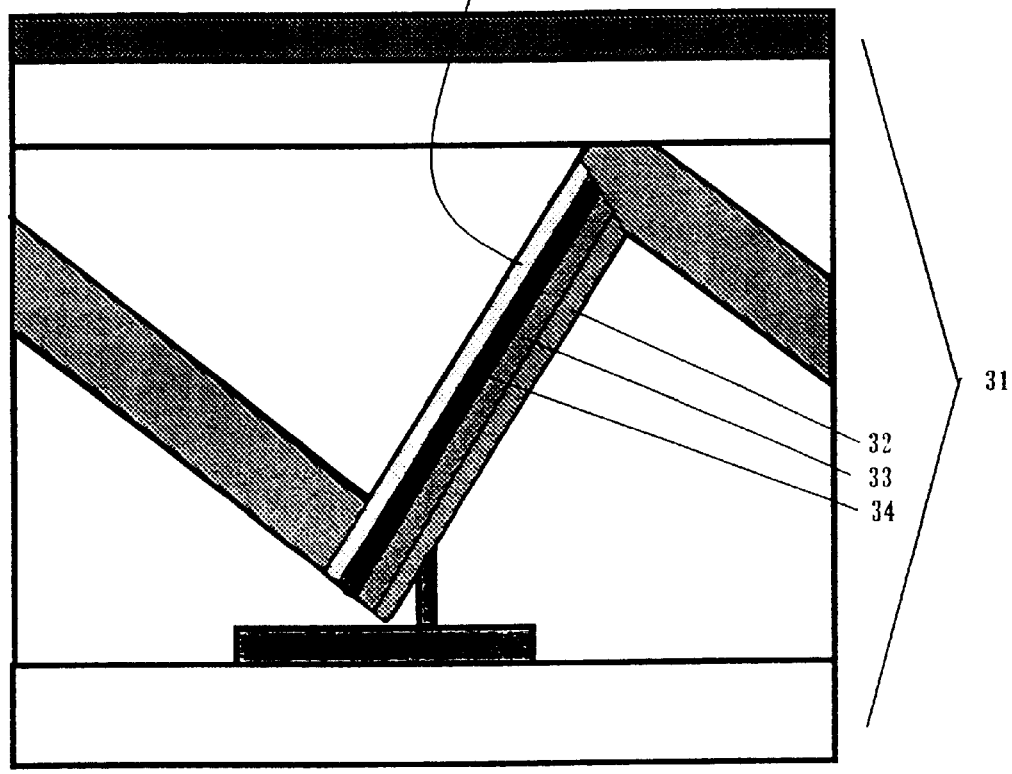
FIG. 4 is a cross-sectional view illustrating a main portion of a reflective color display device according to a second specific preferred embodiment of the present invention.

In this preferred embodiment, each reflective region included in each element of the display device 31 has a multilayer structure consisting of metallic reflective electrode 32, color filter 33 and cholesteric liquid crystal layer 34 as shown in FIG. 4. FIG. 4 illustrates a detailed structure for just one of the three reflective regions included in each element. It should be understood that each of the other two reflective regions not illustrated also has the same multilayer structure consisting of the metallic reflective electrode 32, color filter 33 and cholesteric liquid crystal layer 34.

The liquid crystal layer 34 is interposed between the metallic reflective electrode 32 and a common electrode (or counter electrode) 35. By creating a desired electric field between these electrodes, the optical properties of the liquid crystal layer 34 are changeable arbitrarily. Also, the upper surface of the metallic reflective electrode 32 serves as a reflective plane for reflecting the incoming light.

In this preferred embodiment, each light modulating layer is made up of the color filter 33 and the cholesteric liquid crystal layer 34 that has been formed over the color filter 33. The three reflective regions included in each element of the corner cube array are provided with three color filters 33 for absorbing light in mutually different wavelength ranges. For example, the reflective region C is provided with the color filter 33 for transmitting light falling within the cyan wavelength range (i.e., absorbing light falling within the red wavelength range) and the cholesteric liquid crystal layer 34 that switches between the state of reflecting light falling within the red wavelength range and the state of reflecting all of the light falling within the visible range.

In a cholesteric liquid crystal layer, liquid crystal molecules are dispersed so that the respective major axes thereof are twisted (i.e., rotate helically) in the vertical direction. The cholesteric liquid crystal layer selectively reflects circularly polarized light having a wavelength corresponding to the twist pitch thereof. The orientations of these liquid crystal molecules are changeable by applying a voltage to the liquid crystal layer. Accordingly, by regulating the voltage to be applied using the metallic reflective electrode 32, the cholesteric liquid crystal layer 34 may be switched between the state of transmitting all of the light falling within the visible range (first state) and the state of selectively reflecting part of the light falling within a particular wavelength range (second state). In the cholesteric liquid crystal layer 34 provided for the reflective region C, the twist pitch thereof is adjusted so as to correspond to a wavelength falling within the red wavelength range.

In the reflective region C having this configuration, if the cholesteric liquid crystal layer 34 is in the state of reflecting light falling within the red wavelength range, then part of the incoming light falling within the red wavelength range is selectively reflected by the liquid crystal layer 34, while the other parts of the incoming light (falling within the cyan wavelength range) are reflected by the metallic reflective electrode 32. On the other hand, if the cholesteric liquid crystal layer 34 is in the state of transmitting all of the light falling within the visible range, then part of the incoming light falling within the red wavelength range is absorbed into the color filter 33, while the other parts of the incoming light falling within the cyan wavelength range are reflected by the metallic reflective electrode 32. That is to say, the light modulating layer of this reflective region C may be switched between the state of reflecting all of the incoming light falling within the visible range and the state of reflecting parts of the incoming light falling within the cyan wavelength range (i.e., absorbing only a part of the light falling within the red wavelength range).

In the reflective region M, the color filter 33 for transmitting light falling within the magenta wavelength range (i.e., absorbing light falling within the green wavelength range) is disposed on the metallic reflective electrode 32. And the cholesteric liquid crystal layer 34, which switches between the state of reflecting light falling within the green wavelength range and the state of reflecting all of the light falling within the visible range, is further disposed on the color filter 33. In this reflective region M, if the cholesteric liquid crystal layer 34 is in the state of reflecting light falling within the green wavelength range, then part of the incoming light falling within the green wavelength range is selectively reflected by the liquid crystal layer 34, while the other parts of the incoming light (falling within the magenta wavelength range) are reflected by the metallic reflective electrode 32. On the other hand, if the cholesteric liquid crystal layer 34 is in the state of transmitting all of the light falling within the visible range, then part of the incoming light falling within the green wavelength range is absorbed into the color filter 33, while the other parts of the incoming light falling within the magenta wavelength range are reflected by the metallic reflective electrode 32. That is to say, the light modulating layer of this reflective region M may be switched between the state of reflecting all of the incoming light falling within the visible range and the state of reflecting parts of the incoming light falling within the magenta wavelength range (i.e., absorbing only a part of the light falling within the green wavelength range).

In the reflective region Y, the color filter 33 for transmitting light falling within the yellow wavelength range (i.e., absorbing light falling within the blue wavelength range) is disposed on the metallic reflective electrode 32. And the cholesteric liquid crystal layer 34, which switches between the state of reflecting light falling within the blue wavelength range and the state of reflecting all of the light falling within the visible range, is further disposed on the color filter 33. In this reflective region Y, if the cholesteric liquid crystal layer 34 is in the state of reflecting light falling within the blue wavelength range, then part of the incoming light falling within the blue wavelength range is selectively reflected by the liquid crystal layer 34, while the other parts of the incoming light (falling within the yellow wavelength range) are reflected by the metallic reflective electrode 32. On the other hand, if the cholesteric liquid crystal layer 34 is in the state of transmitting all of the light falling within the visible range, then part of the incoming light falling within the blue wavelength range is absorbed into the color filter 33, while the other parts of the incoming light falling within the yellow wavelength range are reflected by the metallic reflective electrode 32. That is to say, the light modulating layer of this reflective region Y may be switched between the state of reflecting all of the incoming light falling within the visible range and the state of reflecting parts of the incoming light falling within the yellow wavelength range (i.e., absorbing only a part of the light falling within the blue wavelength range).

In this preferred embodiment, these three types of reflective regions C, Y and M are formed on the three reflective planes of each corner cube. Accordingly, subtractive color mixture required for a color display is realized by each element.

In the preferred embodiment described above, the liquid crystal layer 34 is made of a cholesteric liquid crystal material. Alternatively, any other selectively reflective liquid crystal material (e.g., holographic polymer-dispersed liquid crystal material) may also be used to achieve similar effects.

In this second preferred embodiment, the display operation may be performed as in the first preferred embodiment except for the function of the light modulating layer. According to this preferred embodiment, no light is absorbed in vain into the polarizers, thus increasing the reflectance significantly and realizing display of a bright image.

Embodiment 3

A third specific preferred embodiment of a display device according to the present invention will be described with reference to FIGS. 5A and 5B.

The reflective color display device 43 of this third preferred embodiment also has basically the same structure as that illustrated in FIGS. 3A through 3D. That is to say, as in the reflective color display device 1, a plurality of elements, each having the three reflective regions, is arranged on each of the corner cube arrays. And each set of three reflective regions is disposed so that at least part of the incoming light, which has been incident on the element, is reflected by each one of the three reflective regions after another (i.e., three times in total) and then allowed to go out of the element.

The display device 43 of this third embodiment is different from the display device 1 of the first embodiment in the structure of the light modulating layers. Hereinafter, this point will be described in detail.

Figure 5A:
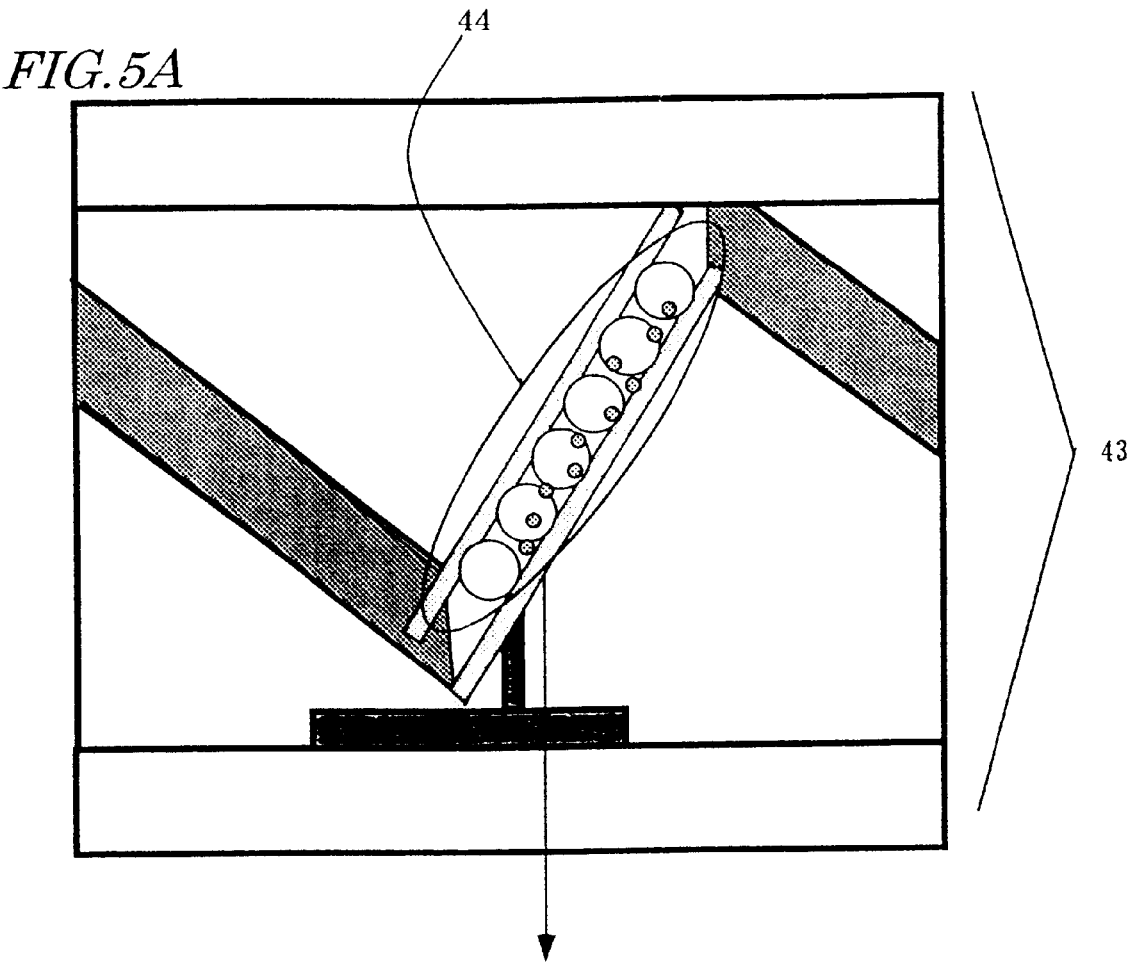
FIG. 5A is a cross-sectional view illustrating a main portion of a reflective color display device according to a third specific preferred embodiment of the present invention.
Figure 5B:
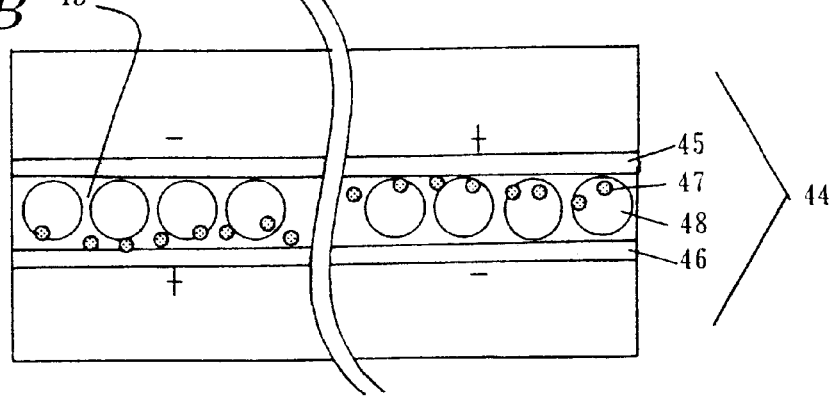
FIG. 5B is a cross-sectional view illustrating the light modulating layer of the third embodiment to a larger scale.

As shown in FIG. 5A, each of the reflective regions included in each element of the display device 43 includes an electrophoretic element 44 as its light modulating layer. The electrophoretic element 44 includes front transparent electrode 45, rear transparent electrode 46 and medium 49 interposed between these electrodes 45 and 46 as shown in FIG. 5B. In the medium 49, electronegative dye particles 47 and white small particles 48 are dispersed.

FIG. 5A illustrates a detailed structure for just one of the three reflective regions included in each element. It should be understood that each of the other two reflective regions not illustrated also has the same structure.

In the reflective region C of this preferred embodiment, dye particles 47 that transmit light falling within the cyan wavelength range (i.e., absorb light falling within the red wavelength range) are dispersed in the medium 49. In this case, if the front transparent electrode 45 is electropositive and the rear transparent electrode 46 is electronegative, then those dye particles 47 absorbing the light falling within the red wavelength range move toward the front transparent electrode 45 due to the electrophoresis effect. Accordingly, the dye particles 47 gather around the incidence-side surface of the light modulating layer, and the white tiny balls 48 are located below the dye particles 47. Then, part of the incoming light falling within the red wavelength range is absorbed into the dye particles 47, while the other parts thereof falling within the cyan wavelength range are reflected by the white small particles 48. As a result, cyan light is reflected from this reflective region C.

On the other hand, if the front transparent electrode 45 is electronegative and the rear transparent electrode 46 is electropositive, then those dye particles 47 move toward the rear transparent electrode 46. In that case, the white small particles 48 reflect the incoming light in the entire visible range.

In this manner, the reflective region C may be switched between the state of reflecting the light falling within the cyan wavelength range (i.e., absorbing only the light falling within the red wavelength range) and the state of reflecting all of the light falling within the visible range.

In the reflective region M, dye particles 47 that transmit light falling within the magenta wavelength range (i.e., absorb light falling within the green wavelength range) are dispersed in the medium 49. Thus, the reflective region M may be switched between the state of reflecting the light falling within the magenta wavelength range (i.e., absorbing only the light falling within the green wavelength range) and the state of reflecting all of the light falling within the visible range.

In the reflective region Y, dye particles 47 that transmit light falling within the yellow wavelength range (i.e., absorb light falling within the blue wavelength range) are dispersed in the medium 49. Thus, the reflective region Y may be switched between the state of reflecting the light falling within the yellow wavelength range (i.e., absorbing only the light falling within the blue wavelength range) and the state of reflecting all of the light falling within the visible range.

In this manner, by using these three types of dye particles 47 that selectively absorb respective parts of the incoming light falling within mutually different wavelength ranges for the three reflective regions of each element, a full-color display is realized as in the first embodiment.

It should be noted that in this preferred embodiment, the rear transparent electrode 46 does not provide any light reflective plane but is used for controlling the electrophoresis of the dye particles 47.

In this third preferred embodiment, the display operation may be performed as in the first preferred embodiment except for the function of the light modulating layer. According to this preferred embodiment, no light is absorbed in vain into the color filters or polarizers, thus increasing the reflectance significantly and realizing display of a bright image.

In the preferred embodiment described above, the light modulating layer is formed by using dye particles that are movable by electrophoresis. Alternatively, the light modulating layer may also be formed by using dichroic balls, each being a combination of hemispheres in mutually different colors, as disclosed in U.S. Pat. No. 5,604,027. In that case, the dichroic balls are rotated upon the application of a voltage, thereby switching the modulation states of the incoming light.

Embodiment 4

A fourth specific preferred embodiment of a display device according to the present invention will be described with reference to FIGS. 6A through 7C. This fourth preferred embodiment is characterized by the configuration of the corner cube array type reflector. In the other respects, the fourth embodiment is the same as the first embodiment.

Figure 6A:
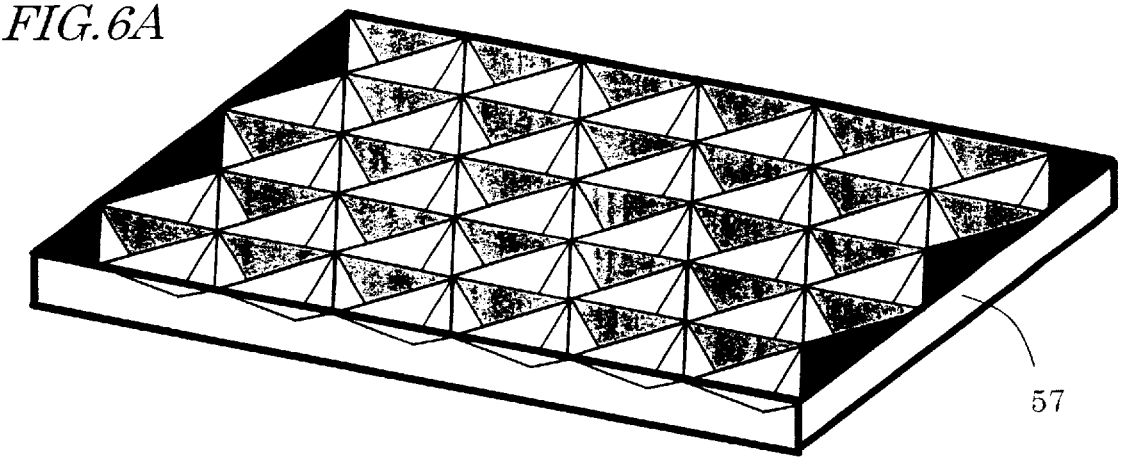
FIGS. 6A and 6B are respectively a perspective view and a plan view illustrating a corner cube array type reflector for use in a fourth specific preferred embodiment of a reflective color display device according to the present invention.
Figure 6B:
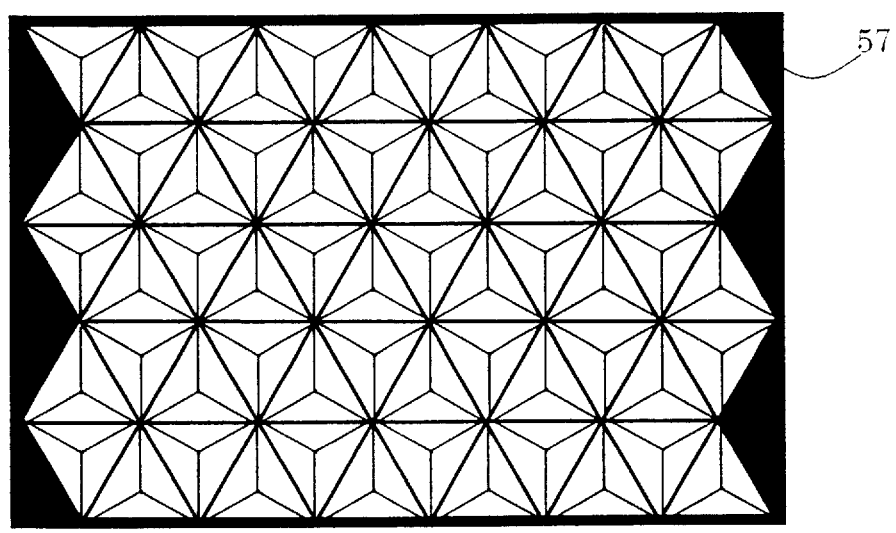

First, referring to FIGS. 6A and 6B, illustrated are a perspective view and a plan view of a corner cube array 57 for use in this fourth embodiment. As shown in FIGS. 6A and 6B, multiple concave portions in the shape of triangular pyramids are densely arranged on the upper surface of this corner cube array 57. That is to say, each of these concave portions corresponds to an element of the reflector.

In the corner cube array shown in FIG. 3A, each of the three reflective planes that make up one element is square. On the other hand, in the corner cube array of this fourth embodiment, each reflective plane is triangular.

Figure 7A:
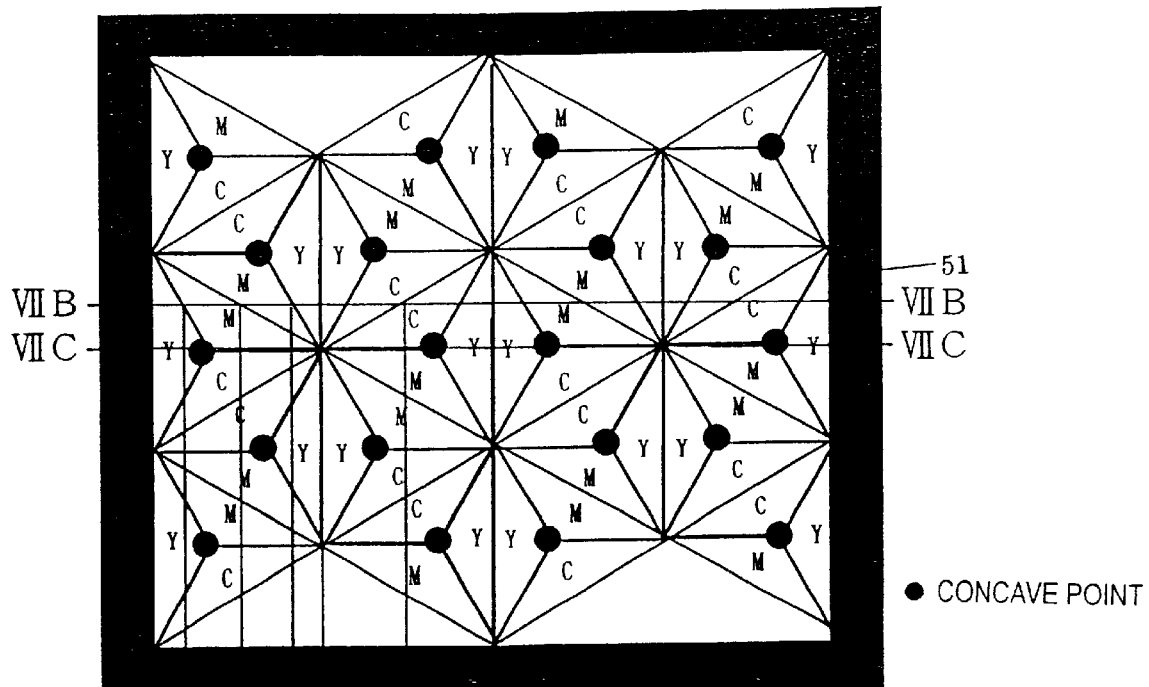
FIG. 7A illustrates a planar layout for a reflective plane according to the fourth embodiment.
Figure 7B:
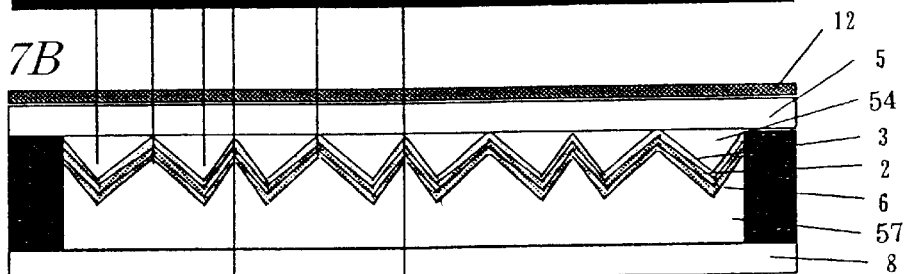
FIGS. 7B and 7C are cross-sectional views thereof taken along the lines VIIB—VIIB and VIIC—VIIC shown in FIG. 7A, respectively.
Figure 7C:
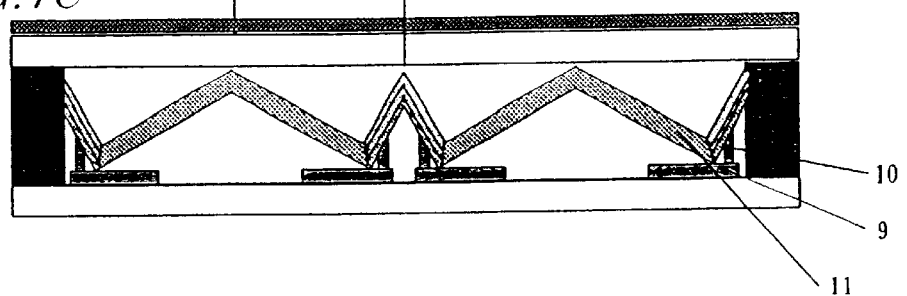

FIG. 7A illustrates a planar layout for the reflective planes of the reflective color display device 51 of this fourth embodiment. FIGS. 7B and 7C are cross-sectional views thereof taken along the lines VIIB—VIIB and VIIC—VIIC shown in FIG. 7A, respectively.

As shown in FIGS. 7B and 7C, the display device 51 has almost the same cross-sectional structure as the counterpart of the first embodiment except the shapes of the corner cube arrays 54 and 57 thereof. Thus, the detailed description thereof will be omitted herein.

The corner cube array 57 of this fourth embodiment is easier to shape and more suitably downsized than the corner cube array of any of the preferred embodiments described above. In the corner cube array of this embodiment, however, the ratio of an area of each reflective plane contributing to forming the retro-reflected light to the total area thereof is relatively small, resulting in lower optical efficiency.

Embodiment 5

In each of the preferred embodiments described above, a voltage (electric field) is applied to the light modulating layer to switch the states thereof. However, the present invention just requires the light modulating layer to switch between two or more states and thereby change the spectral distribution of the incoming light. Thus, in the present invention, the switching is not necessarily caused by the application of an electric field.

Accordingly, the states of the light modulating layer may also be switched by any of various other energies propagated (e.g., magnetic field, light, sound wave, pressure, stress, distortion) so that the incoming light is modulated by the light modulating layer differently.

Hereinafter, an embodiment of switching the states of the light modulating layer by a method other than the voltage application will be described with reference to FIGS. 8A through 8C.

Figure 8A:
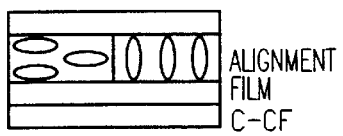
FIGS. 8A, 8B and 8C respectively illustrate configurations for reflective regions C, M and Y for use in a fifth specific preferred embodiment of a reflective color display device according to the present invention.
Figure 8B:
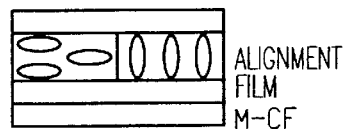
Figure 8C:
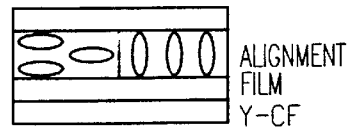

FIGS. 8A, 8B and 8C illustrate cross-sectional structures of the reflective regions C, M and Y, respectively. In FIGS. 8A through 8C, C-CF is a color filter that absorbs red light and reflects cyan light, M-CF is a color filter that absorbs green light and reflects magenta light, and Y-CF is a color filter that absorbs blue light and reflects yellow light. As in the preferred embodiments described above, these reflective regions are appropriately disposed on the three reflective planes of each element of the reflector as shown in FIG. 3A.

In each of these reflective regions, the light modulating layer may be switched between two mutually different states. In each of FIGS. 8A through 8C, the light modulating layer in one state is illustrated on the left-hand side, and the light modulating layer in the other state is illustrated on the right-hand side.

In the example illustrated in FIGS. 8A through 8C, each light modulating layer is a liquid crystal layer, and an alignment film is provided between the liquid crystal layer and its associated color filter. By changing the orientations of the liquid crystal molecules in the liquid crystal layer, the states of the liquid crystal layer may be switched. In this example, the refractive index of the liquid crystal layer changes as a result of this state transition. As the difference in refractive index between the liquid crystal layer and the alignment film changes, the incoming light is either reflected from, or transmitted through, the interface between the liquid crystal layer and the alignment film.

In this preferred embodiment, the light reflective plane is located under each color filter. Accordingly, by controlling the molecular orientations of the liquid crystal layer, the incoming light may be selectively reflected either from the front side of the color filter (i.e., from the interface between the liquid crystal layer and the alignment film) or from the rear side of the color filter (i.e., from the reflective film). In other words, each reflective region may be switched between the state of reflecting all of the incoming light falling within the visible range without allowing the color filter to absorb any part of the light and the state of allowing the color filter to absorb part of the incoming light falling within the red, green or blue wavelength range and then reflecting the remaining parts of the light. By performing this switching, a full-color display is realized as in the embodiments described above.

The states of the liquid crystal layer may be changed by applying a voltage thereto as described above. In this preferred embodiment, the liquid crystal layer has its states switched by irradiating the alignment film with an ultraviolet ray. When the alignment film is exposed to an ultraviolet ray, the properties of the alignment film change at the surface thereof. As a result, the orientations of the liquid crystal molecules, which are in contact with the alignment film, also change. Thus, matrix addressing is realizable by irradiating an ultraviolet ray from a spatial light modulator such as a light valve.

Embodiment 6

Hereinafter, another embodiment of switching the states of the light modulating layer by a method other than the electric field application will be described with reference to FIGS. 9A through 9C.

Figure 9A:
FIGS. 9A, 9B and 9C respectively illustrate configurations for reflective regions C, M and Y for use in a sixth specific preferred embodiment of a reflective color display device according to the present invention.
Figure 9B:
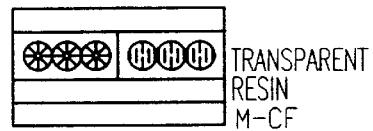
Figure 9C:

FIGS. 9A, 9B and 9C illustrate configurations for the reflective regions C, M and Y, respectively. In this preferred embodiment, the light modulating layer includes a large number of microcapsules, each containing liquid crystal molecules therein. A transparent resin film with a low refractive index is provided between such a light modulating layer and the color filter. And a light reflective plane is located under the color filter.

In this preferred embodiment, by controlling the orientations of the liquid crystal molecules contained in the microcapsules, each reflective region may be switched between the state of scattering and reflecting the incoming light from the microcapsules and the state of reflecting the incoming light from the rear side of the color filter (i.e., from the light reflective plane). In other words, each reflective region may be switched between the state of reflecting all of the incoming light falling within the visible range without allowing the color filter to absorb any part of the light and the state of allowing the color filter to absorb part of the incoming light falling within the red, green or blue wavelength range and then reflecting the remaining parts of the light. By performing this switching, a full-color display is realized as in the preferred embodiments described above.

In this preferred embodiment, the orientations of the liquid crystal molecules contained in the microcapsules are controllable by externally applied heat. To perform matrix addressing by such a heating technique, electrodes or lines (not shown) that can generate heat to controlled degrees for respective reflective regions are preferably formed on the reflection-side substrate.

Each of the preferred embodiments of the present invention described above is a reflective display device that is so constructed as to conduct a full-color display operation. However, the present invention is not limited to these specific embodiments. Instead, a display device for conducting a multi-color or monochrome display operation is also realized in accordance with the present invention.

The present invention is not either limited to a reflective display device that uses sunlight as a typical light source. Alternatively, the present invention is also applicable to a device for conducting a display operation using sunlight and a light source such as a front light in combination. Furthermore, the present invention is also applicable to a projective display device for forming an image on a screen and to a display device of the type forming an image on the human retinas (e.g., mount viewer). However, if the corner cube array type reflector shown in FIG. 1 is used for these types of display devices, then the incoming light is retro-reflected toward the light source. For that reason, an optical member or optical system for deflecting the retro-reflected light toward the projection plane (i.e., screen or retinas) is needed in such a case. However, no scattering film is needed instead. If the positional relationship between the light source and the projection plane is already specified, the directions that the respective light reflective planes of the corner cube reflector face should be designed appropriately. Then, the light emitted from the light source may be reflected by one of the three light reflective regions of each element after another, and then guided to the projection plane as intended. Unlike the "corner cube" in a narrow sense, such a reflector cannot always form retro-reflected light, i.e., light reflected to the direction antiparallel to that of the incoming light.

Furthermore, the present invention does not require that each element of the reflector have the three light reflective planes. Alternatively, each element may have two, four or more light reflective planes so that the incoming light is reflected by one of these reflective planes after another. In that case, the incoming light does not have to be white light but may be light falling within a selected wavelength range.

Furthermore, the reflective planes of the reflector do not have to be planar but may be conical or concave. This is because the incoming light may also be modulated and reflected a number of times by appropriately disposing the light modulating layers.

Furthermore, the material or the size of the reflector is not limited to that exemplified for the preferred embodiments described above.

According to the present invention, a color display is realized with the lightness of color white increased and without allowing the incoming light to be absorbed into polarizers or color filters for nothing. In addition, according to the present invention, no modulating layers like liquid crystal layers are stacked, thus eliminating the parallax problem and simplifying the fabrication process advantageously.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A display device comprising a reflector in which a plurality of elements, each including a number of reflective regions, is arranged and in which the reflective regions of each said element are disposed so that at least part of incoming light, which has been incident on the element, is reflected by each one of the reflective regions after another and then allowed to go out of the element,
   wherein at least one of the reflective regions of each said element includes:
     a light reflective plane; and
     a light modulating layer that is formed on one side of the light reflective plane so as to face the incoming light.

2. The display device of claim 1, wherein each of the reflective regions of each said element includes the light reflective plane and the light modulating layer, and
   wherein the light modulating layers included in each said element modulate the incoming light in mutually different wavelength ranges.

3. The display device of claim 1, wherein the light reflective plane is a surface of a metal layer.

4. The display device of claim 1, wherein the light reflective plane is a boundary between two types of materials having mutually different refractive indices.

5. The display device of claim 1, wherein the light reflective plane comprises a planar portion.

6. The display device of claim 5, wherein each said element comprises three planar portions that are opposed perpendicularly to each other to form a corner cube.

7. The display device of claim 6, wherein each of the three planar portions that make up the corner cube has a substantially square shape, and
   wherein in each said element, the three planar portions of the corner cube are opposed mutually adjacently and perpendicularly to each other to define three sides of a single cube that share one vertex.

8. The display device of claim 7, wherein the three light modulating layers, disposed on the three sides of each said cube that are opposed perpendicularly to each other to share one vertex thereof with each other, modulate the incoming light in the same wavelength range.

9. The display device of claim 1, wherein the reflective regions are disposed on a single continuous curved surface.

10. The display device of claim 2, wherein each said light modulating layer switches from a state of absorbing part of the incoming light falling within a selected wavelength range into a state of transmitting another part of the incoming light falling within a wavelength range that includes at least the selected wavelength range, or vice versa.

11. A display device comprising a reflector in which a plurality of elements, each including three reflective regions, is arranged and in which the three reflective regions of each said element are disposed so that at least part of incoming light, which has been incident on the element, is reflected by each one of the three reflective regions after another and then allowed to go out of the element,
   wherein each of the three reflective regions of each said element includes:
     a light reflective plane; and
     a light modulating layer that is formed on one side of the light reflective plane so as to face the incoming light.

12. The display device of claim 11, further comprising means for separately driving the three light modulating layers included in the three reflective regions of each said element.

13. This display device of claim 1, wherein the light modulating layer included in a first one of the three reflective regions of each said element is a host liquid crystal layer including a guest that absorbs red, and
   wherein the light modulating layer included in a second one of the three reflective regions is a host liquid crystal layer including a guest that absorbs green, and
   wherein the light modulating layer included in the other, third reflective region is a host liquid crystal layer including a guest that absorbs blue.

14. The display device of claim 11, wherein the light modulating layer included in a first one of the three reflective regions of each said element comprises: a switching layer changing from a state of selectively reflecting red into a state of slectively transmitting red, or vice versa; and a color filter absorbing red, and
   wherein the light modulating layer included in a second one of the three reflective regions comprises: a switching layer changing from a state of selectively reflecting green into a state of selectively transmitting green, or vice versa; and a color filter absorbing green, and
   wherein the light modulating layer included in the other, third reflective region comprises: a switching layer from a state of selectively reflecting blue into a state of selectively transmitting blue, or vice versa; and a color filter absorbing blue.

15. The display device of claim 14, wherein each said switching layer is made of a cholesteric liquid crystal material.

16. The display device of claim 14, wherein each said switching layer is made of a holographic polymer-dispersed liquid crystal material.

17. A display device comprising a reflector in which a plurality of elements, each including a number of reflective regions, is arranged and in which the reflective regions of each said element are disposed so that at least part of incoming light, which has been incident on the element, is reflected by each one of the reflective regions after another and then allowed to go out of the element, wherein at least one of the reflective regions of each said element includes a light modulating layer that is changeable between at least two states in which light, falling within a particular wavelength range selected from the visible range, is absorbed to mutually different degrees.

18. The display device of claim 17, wherein the light modulating layer has a thickness approximately equal to or greater than the wavelength of visible radiation.

19. The display device of claim 17, wherein the light modulating layer changes its states when a voltage is applied thereto.

20. The display device of claim 19, further comprising an electrode for changing the states of the light modulating layer.

21. The display device of claim 19, wherein the light modulating layer contains a substance that absorbs the light falling within the particular wavelength range, and wherein a physical state of the substance changes when the voltage is applied thereto.

22. The display device of claim 19, wherein the light modulating layer contains a substance that absorbs the light falling within the particular wavelength range, and wherein a position of the substance changes when the voltage is applied thereto.

23. The display device of claim 17, wherein the light modulating layer contains a substance that reflects visible radiation.

24. The display device of claim 17, wherein the light modulating layer comprises:

a medium;

a first type of particles, which are dispersed in the medium, absorb the light falling within the particular wavelength range and are movable in the medium; and a second type of particles, which are also dispersed in the medium and reflect visible radiation, wherein a degree to which the light modulating layer absorbs the light falling within the particular wavelength range is controlled by the movement of the first type of particles.

25. The display device of claim 17, wherein the light modulating layer comprises a rotator that is changeable from a state of absorbing the light falling within the particular wavelength range into a state of reflecting the visible radiation, or vice versa, when rotates.

26. The display device of claim 25, wherein the rotator is a particle including multiple parts that have mutually different optical properties.

27. A display device comprising a reflector that includes a concave portion reflecting at least part of incoming light a number of times, wherein a light modulating layer, which is changeable between at least two states in which light, falling within a particular wavelength range selected from the visible range, is absorbed to mutually different degrees, has been formed in the concave portion of the reflector.

28. A display device comprising a reflector that includes a concave portion reflecting at least part of incoming light a number of times, wherein first and second light modulating layers have been formed in the concave portion of the reflector, the first light modulating layer being changeable between at least two states in which light, falling within a first wavelength range selected from the visible range, is absorbed to mutually different degrees, the second light modulating layer being changeable between at least two states in which light, falling within a second wavelength range selected from the visible range, is absorbed to mutually different degrees, the second wavelength range being different from the first wavelength range, and wherein a spectral distribution of the incoming light is changeable by the first and second light modulating layers.

* * * * *